US007835862B2

(12) United States Patent
Mizuochi

(10) Patent No.: US 7,835,862 B2
(45) Date of Patent: Nov. 16, 2010

(54) POSITIONING DEVICE, CONTROL METHOD OF POSITIONING DEVICE, CONTROL PROGRAM OF POSITIONING DEVICE, AND COMPUTER READABLE RECORDING MEDIUM RECORDING CONTROL PROGRAM OF POSITIONING DEVICE

(75) Inventor: Shunichi Mizuochi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1212 days.

(21) Appl. No.: 11/438,263

(22) Filed: May 23, 2006

(65) Prior Publication Data
US 2006/0271294 A1    Nov. 30, 2006

(30) Foreign Application Priority Data
May 24, 2005   (JP)   ............................. 2005-151048

(51) Int. Cl.
*G06F 19/00*   (2006.01)
*G00S 5/00*   (2006.01)
(52) U.S. Cl. .................. 701/213; 701/208; 342/357.13; 342/357.17
(58) Field of Classification Search ................. 701/207, 701/301, 213, 216, 217, 220, 208, 209, 214; 340/995.13, 357.15, 357.06, 357.13; 455/456.1
See application file for complete search history.

(56) References Cited

U.S. PATENT DOCUMENTS

| 5,359,521 | A | * | 10/1994 | Kyrtsos et al. .............. 701/215 |
| 5,390,124 | A | * | 2/1995 | Kyrtsos ........................ 701/215 |
| 5,436,632 | A | * | 7/1995 | Sheynblat .............. 342/357.03 |
| 5,490,073 | A | * | 2/1996 | Kyrtsos ....................... 701/207 |
| 5,504,482 | A | * | 4/1996 | Schreder ................ 340/995.13 |
| 5,808,581 | A |   | 9/1998 | Braisted et al. |
| 6,040,798 | A | * | 3/2000 | Kinal et al. ............. 342/357.01 |
| 6,055,477 | A | * | 4/2000 | McBurney et al. .......... 701/207 |
| 6,088,654 | A | * | 7/2000 | Lepere et al. ................ 701/301 |
| 6,493,650 | B1 | * | 12/2002 | Rodgers et al. ............. 702/150 |
| 6,552,681 | B1 |   | 4/2003 | Hayward et al. |
| 2002/0089449 | A1 | * | 7/2002 | Fox ........................... 342/417 |
| 2005/0033515 | A1 | * | 2/2005 | Bozzone ..................... 701/214 |
| 2005/0062602 | A1 | * | 3/2005 | Fujiwara et al. .......... 340/539.1 |

FOREIGN PATENT DOCUMENTS

| EP | 1531338 A2 | 5/2005 |
| JP | 62-276477 | 12/1987 |
| JP | 2001-197564 A | 7/2001 |
| JP | 2002-341012 | 11/2002 |
| JP | 2004-233150 A | 8/2004 |
| WO | WO 2004/005996 A1 | 7/2004 |

* cited by examiner

*Primary Examiner*—Ronnie Mancho
(74) *Attorney, Agent, or Firm*—Global IP Counselors, LLP

(57) ABSTRACT

A positioning device includes: altitude information storing means; satellite signal receiving means; three-dimensional coordinate information generating means; positioning condition information generating means for generating positioning condition information indicating positioning condition when the three-dimensional coordinate information has been generated; reliability allowable range judging means for judging whether reliability of three-dimensional altitude information included in the three-dimensional coordinate information is within a predetermined reliability allowable range or not based on the positioning condition information; altitude information renewing means for renewing the altitude information by using the three-dimensional altitude information based on judging result of the reliability allowable range judging means; two-dimensional coordinate information generating; and positioning method deciding means for deciding whether to use the three-dimensional coordinate information generating means or to use the two-dimensional coordinate information generating means based on judging result of the renewal time evaluating means.

5 Claims, 8 Drawing Sheets

F I G. 1
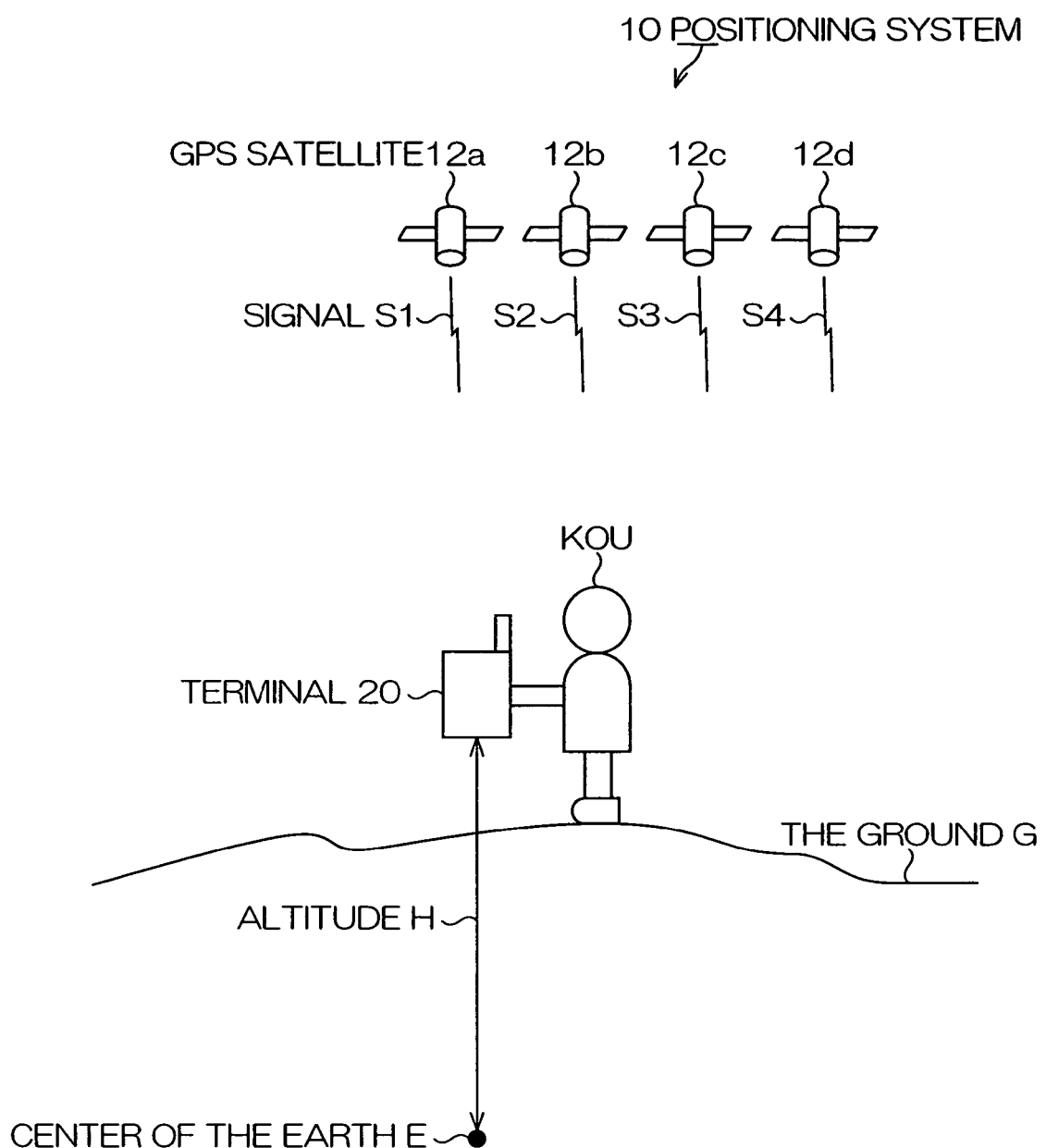

FIG.4

(a) GAIN DECIDING PROGRAM(122)

| GAIN COUNTER | 0 | 1 | 2 | 3 | 4 | 5 | 6 | 7 | 8 | 9 |
|---|---|---|---|---|---|---|---|---|---|---|
| GAIN | 1 | 1.5 | 2 | 2.5 | 3 | 3.5 | 4 | 4.5 | 5 | 5.5 |

(b) ALTITUDE H1 WHICH TERMINAL HAS $\uparrow$
GAIN 5.5
GAIN 5
GAIN 4.5
GAIN 4
GAIN 3.5
GAIN 3
GAIN 2.5
GAIN 2
GAIN 1.5
GAIN 1
$\downarrow$

ALTITUDE H2 INDICATED
IN THREE-DIMENSIONAL ALTITUDE INFORMATION (c) GAIN DECIDING PROGRAM(122)

| GAIN COUNTER | 0 | 1 | 2 | 3 | 4 | 5 | 6 | 7 | 8 | 9 |
|---|---|---|---|---|---|---|---|---|---|---|
| GAIN | 1 | 1 | 2 | 2 | 3 | 3 | 4 | 4 | 5 | 5 |

F I G.6
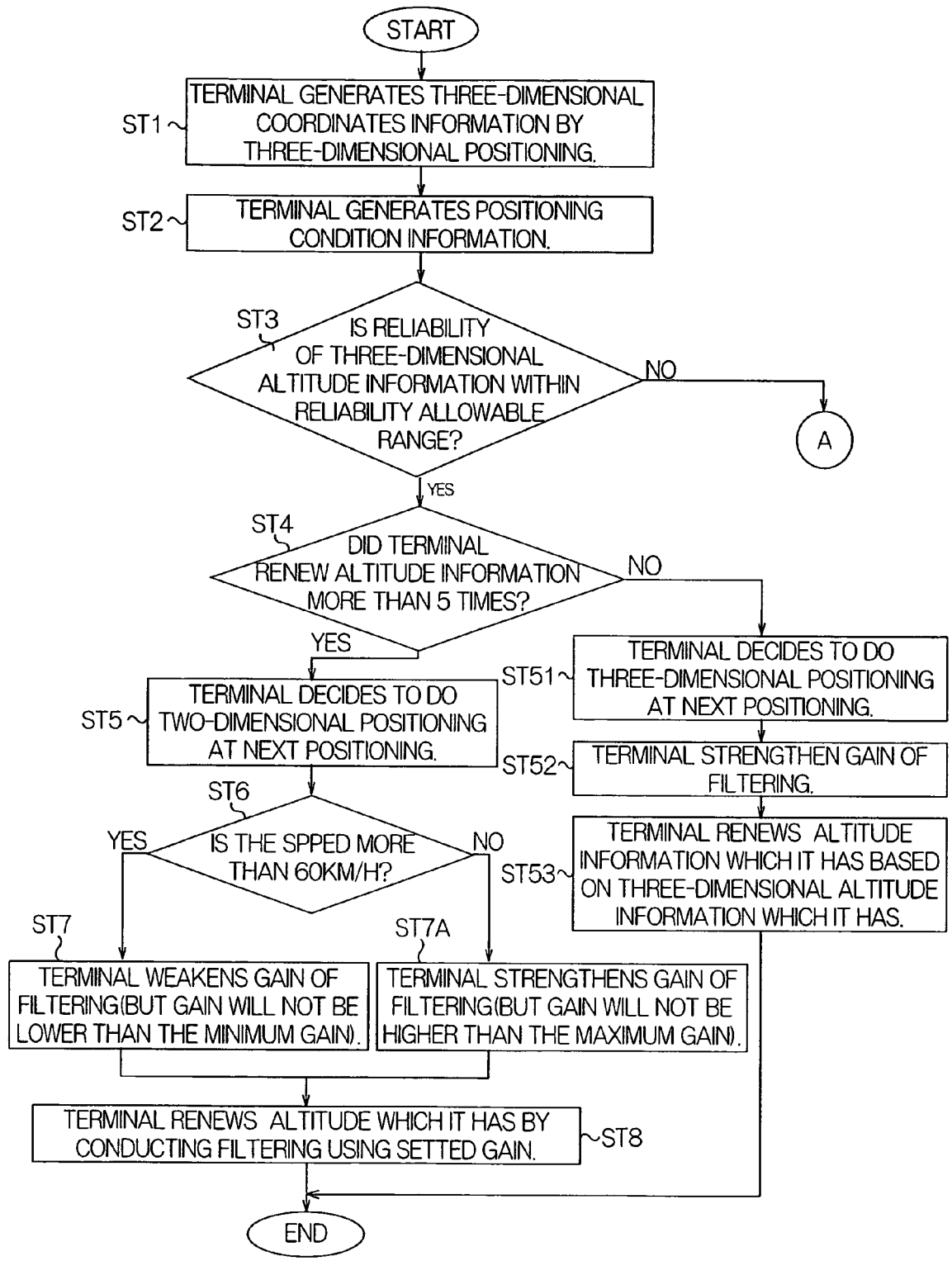

POSITIONING DEVICE, CONTROL METHOD OF POSITIONING DEVICE, CONTROL PROGRAM OF POSITIONING DEVICE, AND COMPUTER READABLE RECORDING MEDIUM RECORDING CONTROL PROGRAM OF POSITIONING DEVICE

This application claims the priorities benefit under 35 U.S.C. §119 of Japanese Patent Application No. 2005-151048 filed on May 24, 2005, which is hereby incorporated in its entirety by reference.

BACKGROUND

1. Technical Field

The present invention relates to a positioning device using signals from positioning satellites, a control method of the positioning device, a control program of the positioning device, and a computer readable recording medium recording the control program of the positioning device.

2. Related Art

In the past, a positioning system for positioning a current position of a GPS receiver by using a satellite navigation system, such as GPS (Global Positioning System), has been put into practical use.

The GPS receiver receives signals from a plurality of GPS satellites, and obtains a distance (hereinafter, referred to as pseudo-distance) between each GPS satellite and the GPS receiver by a difference (hereinafter, referred to as delay time) between the time at which the signal is sent from each GPS satellite and the time at which the signal arrives at the GPS receiver. And, a positioning calculation of the current position is performed by using satellite orbit information of each GPS satellite put in the signal received from each GPS satellite and the above-described pseudo-distance.

The GPS receiver can perform three-dimensional positioning to calculate latitude, longitude, and altitude of the current position when the receiver can receive the signal from four or more GPS satellites.

And, the GPS receiver can perform two-dimensional positioning to calculate latitude and longitude of the current position when the receiver can receive the signal from three GPS satellites. The GPS receiver assumes the center of the earth as one GPS satellite and assumes a distance from the center of the earth to the current position as the pseudo-distance. And the GPS receiver performs the positioning calculation as in the case of the three-dimensional positioning. Therefore, in the two-dimensional positioning, the GPS receiver is required to hold altitude information of the current position, in advance.

In relation with the above, a technique of performing the two-dimensional positioning by using altitude obtained by map data (for example, JP A-2002-341012), and a technique of performing the two-dimensional positioning by using altitude calculated by using a combination of the GPS satellites with minimum VDOP (Vertical Dilution of Precision) at a previous positioning, or altitude calculated by a previous three-dimensional positioning (for example, JP B-06-75103) have been suggested.

However, to keep map data places a huge burden on storing means, and there is a case in which an error of altitude information obtained from the map data is large.

And, even if altitude calculated by using a combination of GPS satellites with minimum VDOP at a previous positioning is used, there is a case in which an error of altitude is large due to a bad positioning condition (environment in which signal strength is weak, or multi path is large) at the previous positioning. Further, there is a problem that there is a case in which the error of altitude is large due to the bad positioning condition at the previous positioning, even with a method of using altitude calculated by the previous three-dimensional positioning.

SUMMARY

An advantage of some aspects of the present invention is to provide a positioning device capable of obtaining accurate altitude information for use in two-dimensional positioning while reducing burden on memory to hold altitude data and an effect of a bad positioning condition at a previous positioning, a control method of the positioning device, a control program of the positioning device, and a computer readable recording medium recording the control program of the positioning device.

According to a first aspect of the invention, the advantage is attained by a positioning device comprising: altitude information storing means for storing altitude information indicating altitude; satellite signal receiving means for receiving satellite signals, which are signals from positioning satellites; three-dimensional coordinate information generating means for generating three-dimensional coordinate information by performing a three-dimensional positioning based on the satellite signals; positioning condition information generating means for generating positioning condition information indicating positioning condition when the three-dimensional coordinate information was generated; reliability allowable range judging means for judging whether reliability of three-dimensional altitude information included in the three-dimensional coordinate information is within a predetermined reliability allowable range or not based on the positioning condition information; altitude information renewing means for renewing the altitude information by using the three-dimensional altitude information based on judging result of the reliability allowable range judging means; renewal time evaluating means for judging whether renewal time of the altitude information is within a predetermined two-dimensional positioning use allowable range or not; two-dimensional coordinate information generating means for generating two-dimensional coordinate information by performing two-dimensional positioning based on the satellite signals and the altitude information; and positioning method deciding means for deciding whether to use the three-dimensional coordinate information generating means or to use the two-dimensional coordinate information generating means based on judging result of the renewal time evaluating means.

According to a configuration of the first aspect of the invention, the positioning device has the reliability allowable range judging means, so that the device can judge whether the three-dimensional altitude information is within the reliability allowable range or not. For example, the positioning device can judge that the three-dimensional altitude information is not within the reliability allowable range when PDOP (Position DOP) thereof is higher than a predetermined value.

And, the positioning device has the altitude information renewing means, so that the device can renew the altitude information by using the three-dimensional altitude information. Since the three-dimensional altitude information is new information generated by the three-dimensional positioning, to renew the altitude information by using the three-dimensional altitude information means to correct the altitude information, which it already has, by the new information. Thereby, altitude indicated in the altitude information can further approximate real altitude.

And, since it is possible to judge whether reliability of the three-dimensional altitude information is within the reliability allowable range or not by the above-described reliability allowable range judging means, a weight of the altitude information relative to the three-dimensional altitude information can be adjusted according to the fact that the three-dimensional altitude information is within the reliability allowable range or not. Therefore, the altitude indicated in the renewed altitude information becomes more accurate.

Meanwhile, the altitude close to the real altitude is referred to as a correct altitude. And information indicating the altitude close to the real altitude is referred to as correct altitude information.

Further, since the positioning device has the renewal time evaluating means, it is possible to judge whether a renewal time of the altitude information is within a predetermined two-dimensional positioning use allowable range or not.

And, the positioning device has the two-dimensional coordinate information generating means, so that it is possible to generate two-dimensional coordinate information by performing the two-dimensional positioning based on the satellite signals and the altitude information based on the judging result of the renewal time evaluating means. Although the reliability of the three-dimensional altitude information is judged whether it is within the reliability allowable range or not by the altitude information reliability judging means, it is possible to make the altitude information more correct by renewing the altitude information by using more new three-dimensional altitude information. That is to say, if the renewal time of the altitude information is more than once and within the two-dimensional positioning use allowable range, the renewed altitude information is correct. And the two-dimensional positioning coordinate information generated by the two-dimensional positioning performed by using the correct altitude information becomes the information indicating the correct position close to the real position.

Herein, since the positioning device holds, for example, only one altitude information and can renew the same by the altitude information renewing means, a burden on memory to hold altitude data is small.

Thereby, according to the positioning device, the correct altitude information for use in the two-dimensional positioning may be obtained while reducing the burden on memory to hold the altitude data and an effect of a bad positioning condition at a previous positioning.

A second aspect of the invention is the positioning device according to the first aspect of the invention, in which the altitude information renewing means is configured to renew the altitude information by making a weight of the altitude information to the three-dimensional altitude information heavier as renewal time of the altitude information increases.

In general, when an object transfers on the surface of the earth, a transfer amount in a vertical direction is smaller than that in a horizontal direction. Therefore, after obtaining correct altitude information as the result of a plurality of renewals of the altitude information, although it is required to renew the altitude information by using new three-dimensional altitude information, it is possible to make the altitude information correct by making the weight of the new three-dimensional altitude information lightened and making the weight of the altitude information which it has heavier.

In this regard, according to a configuration of the second aspect of the invention, the altitude information renewing means is structured so as to renew the altitude information by making the weight of the altitude information to the three-dimensional altitude information heavier as the renewal time of the altitude information increases, so that it is possible to make the altitude information correct while introducing a component of the new three-dimensional altitude information.

A third aspect of the invention is the positioning device according to the first or second aspect of the invention, comprising speed information generating means for generating speed information indicating speed of the positioning device, wherein, the altitude information renewing means is configured to renew the altitude information by making a weight of the altitude information to the three-dimensional altitude information heavier when the speed is within a predetermined speed allowable range, and to renew the altitude information by making a weight of the altitude information to the three-dimensional altitude information lightened when the speed is out of the speed allowable range.

In general, when the object transfers on the surface of the earth, the transfer amount in the vertical direction is smaller when this transfers in a lower speed than when this transfers in a high speed. That is to say, when the object transfers on the surface of the earth, the transfer amount in the vertical direction is large when this transfers in a higher speed than when this transfers in a low speed.

In this regard, according to the third aspect of the invention, the altitude information renewing means is configured to renew the altitude information by making the weight of the altitude information to the three-dimensional altitude information heavier when the speed is within a predetermined speed allowable range, and to renew the altitude information by making the weight of the altitude information to the three-dimensional altitude information lightened when the speed is not within a predetermined speed allowable range, so that it is possible to make the altitude information more correct based on the speed of the positioning device.

The fourth aspect of the invention is the positioning device according to any of the first to third aspects of the inventions in which the altitude information storing means stores one altitude information.

According to a configuration of the fourth aspect of the invention, the altitude information storing means stores one altitude information. And the positioning device can renew the altitude information by the altitude information renewing means.

Therefore, the positioning device can obtain the correct altitude information for use in the two-dimensional positioning while making the burden on memory to hold the altitude data minimum and reducing the effect of the bad positioning condition at the previous positioning.

According to a fifth aspect of the invention, the advantage is attained by a control method of a positioning device, comprising the steps of: generating three-dimensional coordinate information, by performing three-dimensional positioning based on satellite signals by means of a positioning device having altitude information storing means for storing altitude information indicating altitude and satellite signal receiving means for receiving the satellite signals, which are signals from positioning satellites; generating a positioning condition information indicating positioning condition when the three-dimensional coordinate information was generated, by means of the positioning device; judging whether reliability of three-dimensional altitude information included in the three-dimensional coordinate information is within a predetermined reliability allowable range or not based on the positioning condition information, by means of the positioning device; renewing an altitude information by using the three-dimensional altitude information based on a judging result in the step of judging the reliability allowable range, by means of the positioning device; evaluating whether renewal time of the altitude information is within a predetermined two-dimensional positioning use allowable range or not, by means of the positioning device; and deciding whether to perform the three-dimensional positioning or two-dimensional positioning at a next positioning based on a judging result in the step of evaluating the renewal times, by means of the positioning device.

According to a structure of the fifth aspect of the invention, it is possible to obtain the correct altitude information for use in the two-dimensional positioning while reducing the burden on memory to hold the altitude data and the effect of the bad positioning condition at the previous positioning, as the configuration of the first aspect of the invention.

According to a sixth aspect of the invention, the advantage is attained by a control program of a positioning device, causing a computer to execute the steps of: generating three-dimensional coordinate information by performing three-dimensional positioning based on satellite signals by means of the positioning device having altitude information storing means for storing altitude information indicating altitude and satellite signal receiving means for receiving the satellite signals, which are signals from positioning satellites; generating positioning condition information indicating positioning condition when the three-dimensional coordinate information was generated by means of the positioning device; judging whether reliability of three-dimensional altitude information included in the three-dimensional coordinate information is within a predetermined reliability allowable range or not based on the positioning condition information by means of the positioning device; renewing the altitude information by using the three-dimensional altitude information based on a judging result in the step of judging the reliability allowable range, by means of the positioning device; evaluating whether renewal time of the altitude information is within a predetermined two-dimensional positioning use allowable range or not by means of the positioning device; and deciding whether to perform the three-dimensional positioning or two-dimensional positioning at a next positioning based on a judging result in the step of evaluating the renewal times, by means of the positioning device.

According to a seventh aspect of the invention, the advantage is attained by computer readable recording media recording a control program of a positioning device, causing a computer to execute the steps of: generating three-dimensional coordinate information by performing three-dimensional positioning based on satellite signals by means of a positioning device having altitude information storing means for storing altitude information indicating altitude and satellite signal receiving means for receiving the satellite signals, which are signals from positioning satellites; generating a positioning condition information indicating positioning condition when the three-dimensional coordinate information was generated, by means of the positioning device; judging whether reliability of three-dimensional altitude information included in the three-dimensional coordinate information is within a predetermined reliability allowable range or not based on the positioning condition information by means of the positioning device; renewing the altitude information by using the three-dimensional altitude information based on a judging result in the step of judging reliability allowable range, by means of the positioning device; evaluating whether renewal time of the altitude information is within a predetermined two-dimensional positioning use allowable range or not by means of the positioning device; and deciding whether to perform the three-dimensional positioning or two-dimensional positioning at a next positioning based on a judging result in the step of judging the renewal times, by means of the positioning device.

BRIEF DESCRIPTION OF THE DRAWINGS

The invention will be described with reference to the accompanying drawings, wherein like numbers reference like elements.

FIG. 1 is a schematic diagram showing a positioning system according to an embodiment of the present invention;

FIG. 4 is a view showing an example of a gain deciding program;

FIG. 6 is a schematic flowchart showing an operation example of the positioning device;

DESCRIPTION OF EXEMPLARY EMBODIMENTS

Hereinafter, with reference to the drawings, the exemplary embodiments of this invention will be described in detail.

The following embodiments are given various limitations that are preferable technically because they are the exemplary specific examples of the invention; however, the scope of the invention is not limited to these aspects unless there is a particular description to limit the invention in the following descriptions.

FIG. 1 is a schematic diagram showing a positioning system 10 according to an embodiment of the present invention.

As shown in FIG. 1, the positioning system 10 has a terminal 20. The terminal 20 can receive signals S1, S2, S3 and S4, which are signals from GPS satellites 12a, 12b, 12c and 12d, which are positioning satellites, for example. The signals S1 and the like are examples of satellite signals. And, the terminal 20 is an example of the positioning device.

The terminal 20 is held by a user Kou and transfers on a ground G.

The terminal 20 can generate information indicating coordinates of a current position by latitude, longitude and altitude by performing three-dimensional positioning by receiving, for example, the signals S1, S2, S3 and S4 from the four GPS satellites 12a, 12b, 12c and 12d.

And the terminal 20 can generate information indicating coordinates of the current position by latitude and longitude by performing two-dimensional positioning by receiving, for example, the signals S1, S2 and S3 from the three GPS satellites 12a, 12b and 12c. In the two-dimensional positioning, the terminal 20 is required to obtain information indicating altitude H, in advance. And, the more correct the altitude is, the more accurate the two-dimensional positioning is.

Meanwhile, the altitude H is a distance from the center of the earth E to the terminal 20. In the present specification, hereinafter, the term "altitude" is intended to mean the distance from the center of the earth E to the terminal 20.

The terminal 20 is, for example, a cellular phone, and may be PHS (Personal Handy-phone System), PDA (Personal Digital Assistance), a car navigation system, and the like, and is not limited to them.

Meanwhile, unlike in the case of the present embodiment, the quantity of the GPS satellites 12a and the like is not limited to four, and may be three or five or more. Main Hardware Configuration of Terminal 20

Figure 2:
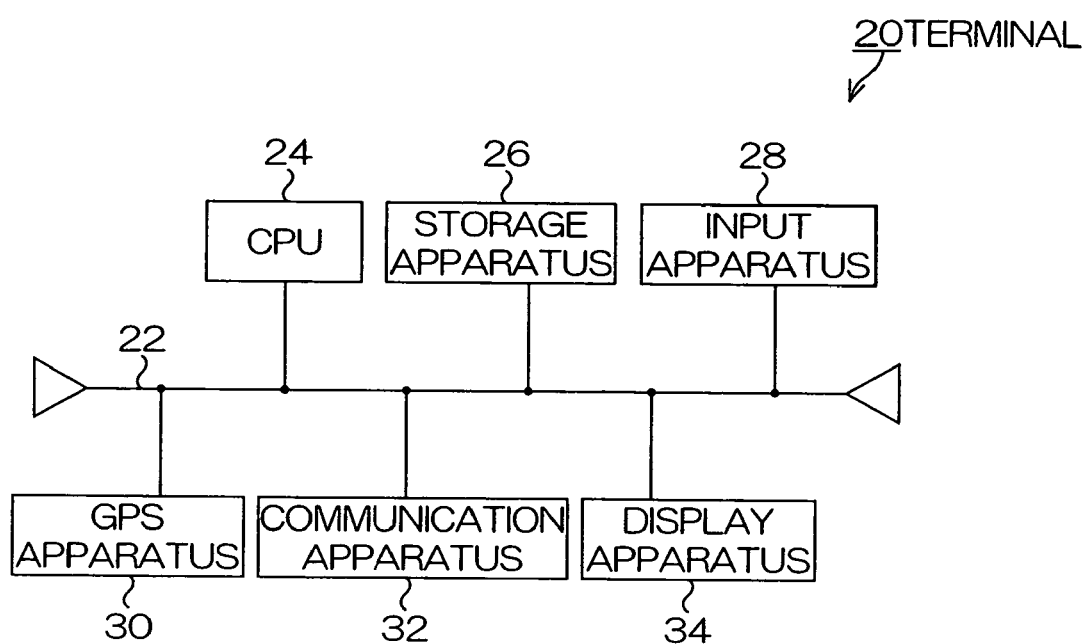
FIG. 2 is a schematic diagram showing a main hardware configuration of a terminal.

FIG. 2 is a schematic diagram showing a main hardware configuration of the terminal 20.

As shown in FIG. 2, the terminal 20 has a computer, and the computer has a bus 22.

CPU (Central Processing Unit) 24, a storage apparatus 26, and the like are connected to the bus 22. The storage apparatus 26 is, for example, RAM (Random Access Memory), ROM (Read Only Memory), or the like.

And, an input apparatus 28 for inputting a variety of information and the like, and a GPS apparatus 30 for receiving the signals S1 and the like from the GPS satellites 12a and the like are connected to the bus 22. The GPS satellite 30 is an example of satellite signal receiving means.

And, a communication apparatus 32 for communicating with the outside and a display apparatus 34 for displaying a variety of information are connected to the bus 22. Main Software Configuration of Terminal 20

Figure 3:
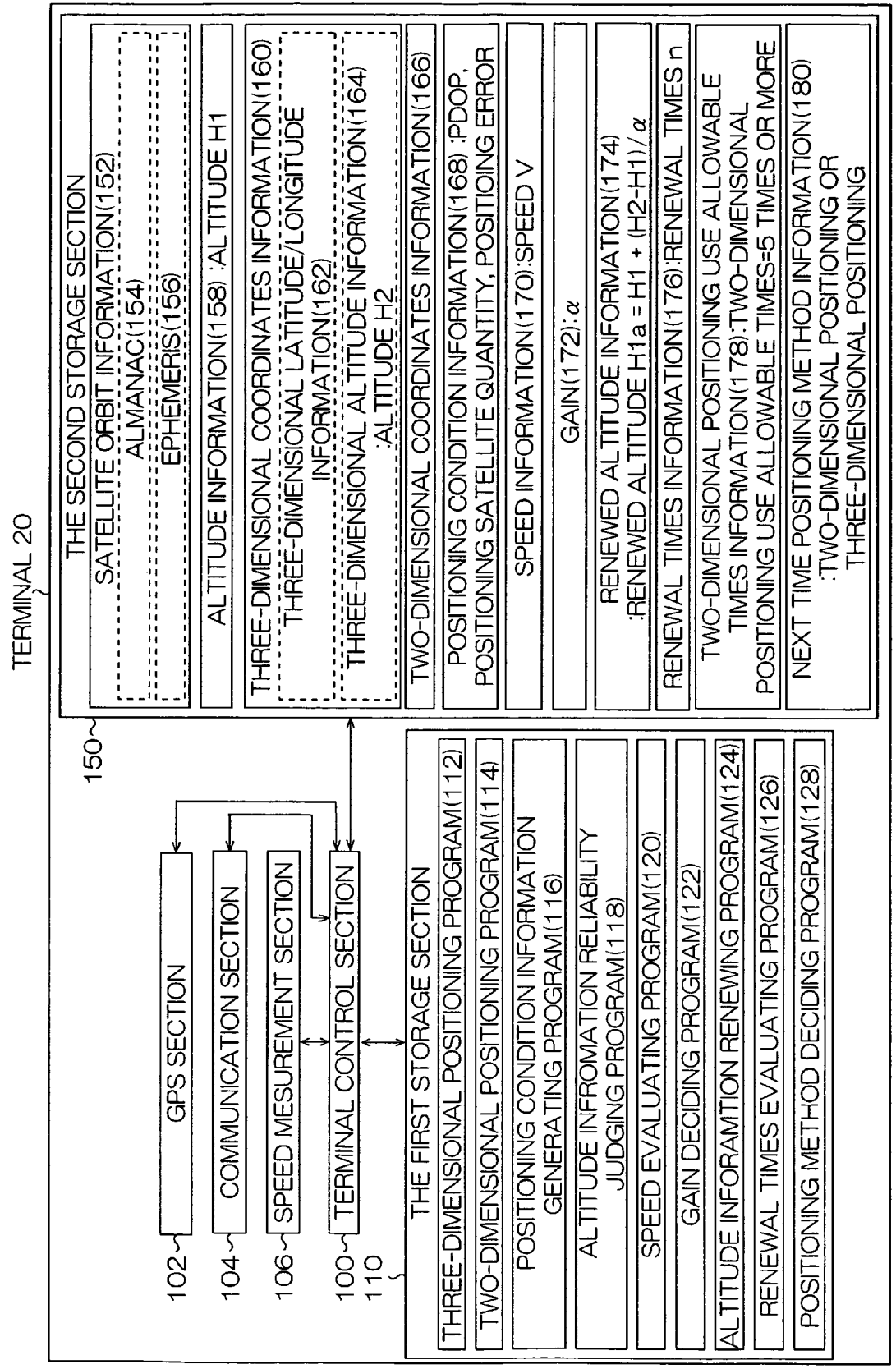
FIG. 3 is a schematic diagram showing a main software configuration of a terminal.

FIG. 3 is a schematic diagram showing a main software configuration of the terminal 20.

As shown in FIG. 3, the terminal 20 has a terminal control section 100 for controlling each section, a GPS section 102 corresponding to the GPS apparatus 30 of the terminal in FIG. 2, a communication section 104 corresponding to the communication apparatus 32, a speed measurement section 106, and the like.

The speed measurement section 106 generates speed information 170 indicating a speed of the terminal 20 based on the Doppler shift and the like of a plurality of the signals S1 and the like received by the GPS section 102 (refer to paragraphs [0016] to [0018] of JPA-08-68651). That is to say, the speed measurement section 106 is an example of speed information generating means.

The terminal control section 100 stores the speed information 170 generated by the speed measurement section 106 in a second storage section 150.

The terminal 20 also has a first storage section 110 for storing a variety of programs and a second storage section 150 for storing a variety of information.

Meanwhile, unlike in the case of the present embodiment, the terminal 20 may be provided with a speed indicator as hardware, and the speed indicator may measure the speed of the terminal 20.

As shown in FIG. 3, the terminal 20 stores satellite orbit information 152 in the second storage section 150. The satellite orbit information 152 includes an almanac 154 and an ephemeris 156.

The almanac 154 is information indicating a schematic orbit of all the GPS satellites 12a and the like (refer to FIG. 1). The almanac 154 is valid, for example, for seven days. Therefore, the terminal 20 renews the almanac 154 by decoding the same from the signal S1 and the like of any of the GPS satellites 12a and the like every seven days.

The ephemeris 156 is information for indicating a precise orbit of each of the GPS satellites 12a and the like (refer to FIG. 1) with the time at which the same is obtained. A valid period of the ephemeris 156 is, for example, four hours (h). Therefore, the terminal 20 renews the ephemeris 156 of each of observable GPS satellites 12a and the like by decoding the same every four hours.

As shown in FIG. 3, the terminal 20 stores one altitude information 158 indicating altitude H1 in the second storage section 150. The altitude information 158 is an example of the altitude information. And, the second storage section 150 is an example of altitude information storing means.

As shown in FIG. 3, the terminal 20 stores a three-dimensional positioning program 112 in the first storage section 110. The three-dimensional positioning program 112 allows the terminal control section 100 to generate three-dimensional coordinate information 160 by performing the three-dimensional positioning based on the signals S1 and the like received by the GPS section 102. The three-dimensional coordinate information 160 is an example of the three-dimensional coordinate information. And, the three-dimensional positioning program 112 and the terminal control section 100 are, as a whole, an example of three-dimensional coordinate information generating means.

Specifically, the terminal 20 receives, for example, the signals S1 and the like from four GPS satellites 12a and the like, and obtains a pseudo-distance, which is a distance between each of the GPS satellites 12a and the like and the terminal 20 based on a delay time, which is a difference between the time at which the signals S1 and the like are sent from each of the GPS satellites 12a and the like and the time at which the same arrives at the terminal 20. And, the terminal 20 performs a positioning calculation of the current position by using the ephemeris 156 of each of the GPS satellites 12a and the like and the above-described pseudo-distance.

The three-dimensional coordinate information 160 includes three-dimensional latitude/longitude information 162 indicating latitude and longitude of the current position of the terminal 20 and three-dimensional altitude information 164 indicating altitude H2 of the current position of the terminal 20.

The terminal control section 100 stores generated three-dimensional coordinate information 160 in the second storage section 150.

As shown in FIG. 3, the terminal 20 stores a two-dimensional positioning program 114 in the first storage section 110. The two-dimensional positioning program 114 allows the terminal control section 100 to generate two-dimensional coordinate information 166 by performing the two-dimensional positioning based on the signals S1 and the like received by the GPS section 102 and the altitude information 158. The two-dimensional coordinate information 166 is an example of the two-dimensional coordinate information. And the two-dimensional positioning program 114 and the terminal control section 100 are, as a whole, an example of two-dimensional coordinate information generating means.

Specifically, the terminal 20 receives, for example, the signals S1 and the like from three GPS satellites 12a and the like, and obtains the pseudo-distance, which is the distance between each of the GPS satellites 12a and the like and the terminal 20 based on the delay time, which is the difference between the time at which the signals S and the like are sent from each of the GPS satellites 12a and the like and the time at which the same arrives at the terminal 20. And the terminal 20 assumes the center of the earth E (refer to FIG. 1) as one GPS satellite, and assumes the altitude H1 indicated in the altitude information 158 as the pseudo-distance between the same and the center of the earth E.

Next, a position of each of the GPS satellites 12a and the like on a satellite orbit at the current time is calculated by the ephemeris 156 of each of the GPS satellites 12a and the like. The position of the center of the earth E is already known. And the terminal 20 performs the positioning calculation of the current position based on the position of each of the GPS satellites 12a and the like on the satellite orbit, the position of the center of the earth E, the pseudo-distance, and the altitude H1.

The two-dimensional coordinate information 166 is information indicating the current position of the terminal 20 by latitude and longitude.

The terminal control section 100 stores generated two-dimensional coordinate information 166 in the second storage section 150.

As shown in FIG. 3, the terminal 20 stores a positioning condition information generating program 116 in the first storage section 110. The positioning condition information generating program 116 allows the terminal control section 100 to generate positioning condition information 168 indicating a positioning condition when generating the three-dimensional coordinate information 160. Positioning condition information 168 is an example of the positioning condition information. And, the positioning condition information generating program 116 and the terminal control section 100 are, as a whole, an example of positioning condition information generating means.

The positioning condition information 168 is the information indicating, for example, PDOP, positioning satellite quantity, and a positioning error.

Meanwhile, unlike in the case of the present embodiment, the positioning condition information may be the information indicating one or two of the PDOP, the positioning satellite quantity, and the positioning error.

As shown in FIG. 3, the terminal 20 stores an altitude information reliability judging program 118 in the first storage section 110. The altitude information reliability judging program 118 allows the terminal control section 100 to judge whether the three-dimensional altitude information 164 is within a predetermined reliability allowable range or not based on the positioning condition information 168. That is to say, the altitude information reliability judging program 118 and the terminal control section 100 are, as a whole, an example of altitude information reliability allowable range judging means.

For example, the terminal control section 100 judges that reliability of the three-dimensional altitude information 164 is within the reliability allowable range when the PDOP indicated in the positioning condition information 168 is 3 or less. A condition in which the PDOP is 3 or less is predetermined. That is to say, the condition in which the PDOP is 3 or less is an example that the reliability is within the reliability allowable range.

Meanwhile, unlike in the case of the present embodiment, the terminal control section 100 may be configured to judge that the reliability of the three-dimensional altitude information 164 is within the reliability allowable range when the positioning satellite quantity is five or more and/or the positioning error is 100 m or less.

As shown in FIG. 3, the terminal 20 stores a speed evaluating program 120 in the first storage section 110. The speed evaluating program 120 allows the terminal control section 100 to judge whether or not a speed V indicated in speed information 170 is 60 km/h or less. The speed of 60 km/h or less is an example of the speed within a predetermined speed allowable range. And the speed greater than 60 km/h is an example of the speed out of the predetermined speed allowable range.

As shown in FIG. 3, the terminal 20 stores a gain deciding program 122 in the first storage section 110. The gain deciding program 122 allows the terminal control section 100 to decide a weight α (hereinafter, referred to as a gain α) of the altitude information 158 relative to the three-dimensional altitude information 164 when renewing the altitude information 158 based on the three-dimensional altitude information 164.

FIG. 4 is a view showing an example of the gain deciding program 122.

As shown in FIG. 4(a), the terminal 20 memorizes the gain corresponding to a gain counter as the gain deciding program 122. The gain deciding program 122 sets the gain counter to by default, for example, to make the gain α to 3.5.

And, the terminal control section 100 judges that the three-dimensional altitude information 164 is within the predetermined reliability allowable range by the altitude information reliability judging program 118, and when renewing the altitude information 158 based on the three-dimensional altitude information 164, this increases the gain counter by 1 to make the gain α larger (hereinafter, referred to as a basic operation). For example, in the case of a first renewal, the terminal control section 100 sets the gain counter to 6 to make the gain α to 4. And in the case of a second renewal, the terminal control section 100 sets the gain counter to 7 to make the gain α to 4.5. In this way, the terminal control section 100 is configured to increase the gain α as the renewal time of the altitude information 158 increases. Meanwhile, to increase the gain α is also referred to as to strengthen the gain α. And, to decrease the gain α is also referred to as to weaken the gain α. The terminal control section 100 gradually increases the gain by increasing the gain counter by 1 at every renewal of the altitude information 158. Thereby, the altitude H1 indicated in the altitude information 158 may be gradually fixed in the vicinity of the real altitude.

On the other hand, when the terminal control section 100 judges that the three-dimension altitude information 164 is not within the predetermined reliability allowable range by the altitude information reliability judging program 118 and renews the altitude information 158 based on the three-dimensional altitude information 164, this sets the gain counter to 9, which is a maximum value, and renews the altitude information 158 with the maximum gain α. Thereby, it is possible to renew the altitude information 158 by introducing components of new three-dimensional altitude information 164, while minimizing an effect of the three-dimensional altitude information 164 out of the reliability allowable range, when renewing the altitude information 158.

As shown in FIG. 4(b), as the gain α increases, the altitude indicated in the renewed altitude information 158 approximates the altitude H1 of the altitude information 158 which it has. And as the gain α decreases, the altitude indicated in the renewed altitude information 158 approximates the altitude H2 of the three-dimensional altitude information 164.

And, the terminal control section 100 increases the gain α by increasing the gain counter by 1 as the above-mentioned basic operation, when the speed V indicated in the speed information 170 is 60 km/h or less.

On the other hand, the terminal control section 100 decreases the gain α by decreasing the gain counter by 1, as an exception of the above-mentioned basic operation, when the speed V indicated in the speed information 170 is more than 60 km/h. For example, in the case of the first renewal, the terminal control section 100 sets the gain counter to 4 to make the gain α to 3.

Meanwhile, unlike in the case of the present embodiment, the gain deciding program 122 may be configured to assign one gain relative to two values of the gain counter, as shown in FIG. 4(c).

As shown in FIG. 3, the terminal 20 stores the altitude information renewing program 124 in the first storage section 110. The altitude information renewing program 124 allows the terminal control section 100 to renew the altitude information 158 by the three-dimensional altitude information 164 by using the gain α set by the above-described gain deciding program 122. The above-described gain deciding program 122, the altitude information renewing program 124 and the terminal control section 100 are, as a whole, an example of altitude information renewing means.

Specifically, the terminal control section 100 generates renewed altitude information 174 indicating renewed altitude H1a by using the set gain α. And, the terminal control section 100 stores generated renewed altitude information 174 in the second storage section 150, and stores the renewed altitude information 174 in the second storage section 150 as new altitude information 158.

The renewed altitude H1a indicated in the renewed altitude information 174 is calculated by, for example, a formula H1a=H1+(H2−H1)÷α.

And, the terminal control section 100 increases a renewal time n indicated by the renewal times information 176 by 1, when this generates the renewed altitude information 174.

As shown in FIG. 3, the terminal 20 stores the renewal time evaluating program 126 in the first storage section 110. The renewal time evaluating program 126 allows the terminal control section 100 to judge whether the renewal time n indicated in the renewal times information 176 is two-dimensional positioning use allowable times indicated in two-dimensional positioning use allowable times information 178 or not. The two-dimensional positioning use allowable times is an example of the predetermined two-dimensional positioning use allowable range. And, the renewal time evaluating program 126 and the terminal control section 100 are, as a whole, an example of renewal time evaluating means.

Specifically, the terminal control section 100 judges that the renewal time is the two-dimensional positioning use allowable times, when this is not less than the two-dimensional positioning use allowable times, which is five, for example.

As shown in FIG. 3, the terminal 20 stores a positioning method deciding program 128 in the first storage section 110. The positioning method deciding program 128 allows the terminal control section 100 to judge whether to perform a next positioning by the three-dimensional positioning or by the two-dimensional positioning based on a judging result by the above-described renewal time evaluating program 126. That is to say, the positioning method deciding program 128 and the terminal control section 100 are, as a whole, an example of positioning method deciding means.

Specifically, the terminal control section 100 decides to perform the next positioning by the two-dimensional positioning when the renewal times, is five or more, and generates next time positioning method information 180 indicating the two-dimensional positioning.

On the other hand, the terminal control section 100 decides to perform the next positioning by the three-dimensional positioning when the renewal time n is less than five, and generates next time positioning method information 180 indicating the three-dimensional positioning. When the renewal time n is less than five, the altitude H1 indicated in the altitude information 158 is not stable, so that it is considered that the positioning result by the three-dimensional positioning is more reliable than that by the two-dimensional positioning, at the next positioning.

The terminal control section 100 stores generated next positioning method information 180 in the second storage section 150.

The positioning system 10 is configured as described above.

As described above, the terminal 20 is configured to renew the altitude information 158 by increasing the gain α, as the renewal time of the altitude information 158 increases.

In general, when an object transfers on the surface of the earth, a transfer amount in a vertical direction is smaller than that in a horizontal direction. Therefore, after obtaining correct altitude information as the result of a plural renewals of the altitude information 158, although it is required to renew the altitude information 158 by using new three-dimensional altitude information 164, it is possible to make the altitude information 158 correct by making the weight of the new three-dimensional altitude information 164 lightened and making the weight of the altitude information 158 which it already has heavier.

In this regard, since the terminal 20 is configured to renew the altitude information 158 by making the weight of the altitude information 158 which it already has heavier, as the renewal time of the altitude information 158 increases, it is possible to make the altitude information 158 more correct.

And as described above, the terminal 20 does not use all the three-dimensional altitude information 164 (refer to FIG. 3) in a similar way for renewing the altitude information 158, but sets the gain α as maximum when using the three-dimensional altitude information 164 generated under a bad positioning condition, that is, for example, with high PDOP. Therefore, it becomes possible to reduce an effect of the bad positioning condition at a previous positioning to the altitude information 158.

Further, the terminal 20 is configured to renew the altitude information 158 by increasing the gain α when the speed V is within the predetermined speed allowable range, and to renew the altitude information 158 by decreasing the gain α when the speed V is out of the predetermined speed allowable range.

In general, when the object transfers on the surface of the earth, the transfer amount in the vertical direction is smaller when this transfers in a lower speed than when this transfers in a high speed. That is to say, when the object transfers on the surface of the earth, the transfer amount in the vertical direction is larger when this transfers in a higher speed than when this transfers in a low speed.

Therefore, when the terminal 20 transfers in a lower speed, it is possible to make the altitude information 158 more correct by renewing the altitude information 158 while making the weight of the new three-dimensional altitude information 164 lightened and making the weight of the altitude information 158 which it has heavier, as compared to the case in which this transfers in a high speed.

In this regard, the terminal 20 renews the altitude information 158 by increasing the gain α, when this transfers in a lower speed, as compared to the case in which this transfers in a high speed. On the other hand, the terminal 20 renews the altitude information 158 by decreasing the gain α, when this transfers in a higher speed, as compared to the case in which this transfers in a low speed. Therefore, the terminal 20 can renew the altitude information 158 by the gain α according to the speed and make the same correct.

And the terminal 20 can renew the altitude information 158 based on the three-dimensional altitude information 164 by using the gain α, which is set based on the positioning condition and the speed. Since the three-dimensional altitude information 164 is new information generated by the three-dimensional positioning, to renew the altitude information 158 by using the three-dimensional altitude information 164 means to correct the altitude information 158 which it already has, by new information. Thereby, the altitude indicated in the altitude information 158 can further approximate to a real altitude.

Further, the terminal 20 can judge whether the renewal time of the altitude information 158 is the predetermined two-dimensional positioning use allowable times or not.

And the terminal 20 can generate the two-dimensional coordinate information 166 by performing the two-dimensional positioning based on the signal S1 and the like from the GPS satellite 12a and the altitude information 158, when the renewal time of the altitude information 158 is five or more, for example. Although the terminal 20 judges whether to use the three-dimensional altitude information 164 for renewing the altitude information 158 or not prior to the two-dimensional positioning, it is possible to make the altitude information 158 information indicating more correct altitude, by renewing the altitude information 158 by using more new three-dimensional altitude information 164. By renewing the altitude information 158 more than once, error of individual three-dimensional altitude information 164 is counterbalanced. Therefore, the altitude information 158 after renewal of five times or more, for example, approximates to the real altitude. And, positioning accuracy of the two-dimensional positioning using the altitude information 158 becomes high.

And, positioning accuracy of the two-dimensional positioning performed by using the correct altitude information 158 is higher than that of the three-dimensional positioning. This is because quantity of combinations of the GPS satellites used for the positioning out of the observable GPS satellites 12a and the like is larger in the two-dimensional positioning, so that it is possible to select one to indicate the current position more correct from a number of positioning results. For example, when the quantity of the observable GPS satellites 12a and the like is five, since four or more GPS satellites are used for one positioning calculation in the case of the three-dimensional positioning, there are six combinations used in the positioning, that is five combinations of four GPS satellites, and one combination of five GPS satellites. On the other hand, when the quantity of the observable GPS satellites 12a and the like is five, since three or more GPS satellites are used for one positioning calculation in the case of the two-dimensional positioning, there are 16 combinations of GPS satellites used in the positioning, that is 10 combinations of three GPS satellites, five combinations of four GPS satellites, and one combination of five GPS satellites.

And when the renewal time of the altitude information 158 is the two-dimensional positioning use allowable times, the two-dimensional coordinate information 166 generated by the two-dimensional positioning performed by using the renewed altitude information 158 becomes correct positioning information close to the real position.

Herein, since the terminal 20 holds only one altitude information 158 and renews this based on the three-dimensional altitude information 164, burden on memory to hold altitude data is small.

Thereby, according to the terminal 20, it becomes possible to obtain correct altitude information used for the two-dimensional positioning while reducing the burden on memory to hold the altitude data and the effect of the bad positioning condition at the previous positioning.

Especially, since the terminal 20 holds only one of altitude information 158, the burden on memory to hold the altitude data is minimum.

Figure 5:
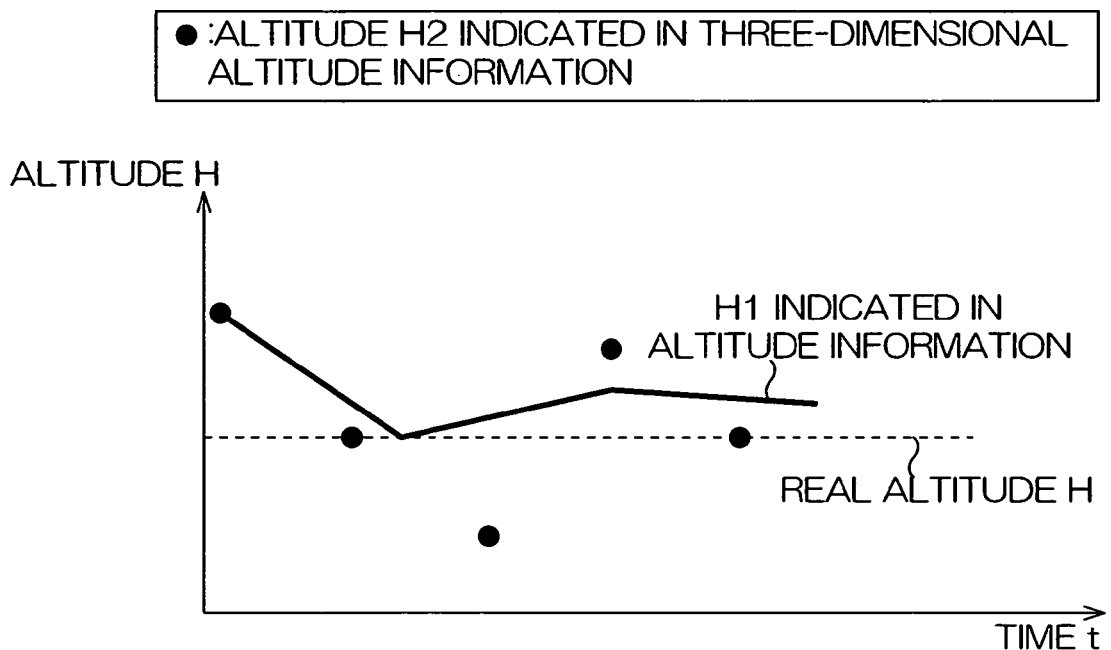
FIG. 5 is a graph showing an example in which altitude information is renewed.

FIG. 5 is a graph showing an example in which the altitude information 158 is renewed.

As shown in FIG. 5, the altitude H1 indicated in the altitude information 158 approximates the real altitude H as the renewal time increases based on the three-dimensional altitude information 164, and is stabilized in a state close to the real altitude H.

The structure of the positioning system 10 according to the present embodiment is as above. Hereinafter, an operation example thereof will be described with reference primarily to FIGS. 6 and 7.

Figure 7:
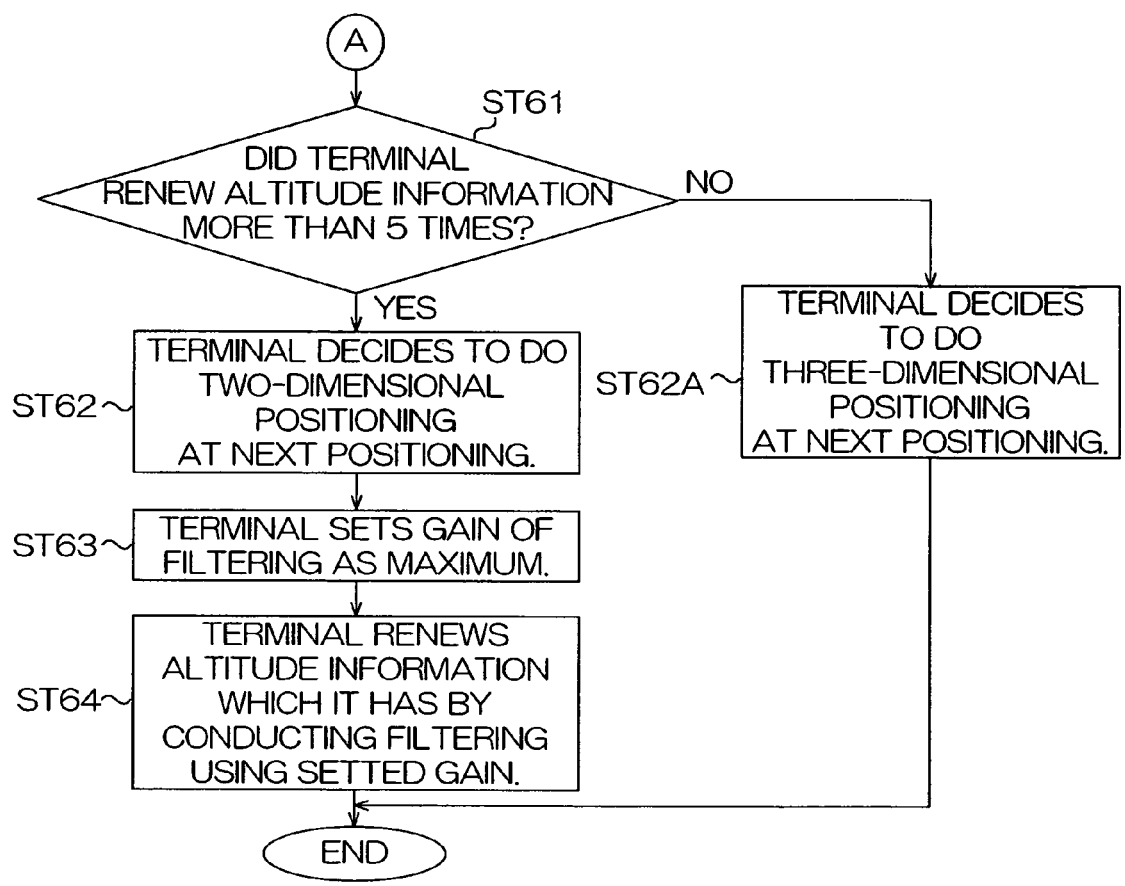
FIG. 7 is a schematic flowchart showing an operation example of the positioning device.

FIGS. 6 and 7 are schematic flowcharts showing the operation example of the positioning system 10 according to the present embodiment.

Meanwhile, an operation in which the terminal 20 renews the altitude information 158 by the three-dimensional altitude information 164 is also referred to as filtering. And, the gain α(refer to FIG. 3) is also referred to as the gain α of the filtering.

First, the terminal 20 generates the three-dimensional coordinate information 160 (refer to FIG. 3) by the three-dimensional positioning (step ST1 in FIG. 6). The step ST1 is an example of a step of generating a three-dimensional coordinate information.

Next, the terminal 20 generates positioning condition information 168 (refer to FIG. 3) (step ST2). The step ST2 is an example of a step of generating a positioning condition information.

Next, the terminal 20 judges whether reliability of three-dimensional altitude information 164 is within the reliability allowable range or not (step ST3). The step ST3 is an example of a step of judging an altitude information reliability.

In the step ST3, when the terminal 20 judges that the reliability of the three-dimensional altitude information 164 is within the reliability allowable range, this judges whether or not the altitude information 158 which it has is renewed five times or more (step ST4). The step ST4 is an example of a step of evaluating a renewal times.

In the step ST4, when the terminal 20 judges that the altitude information 158 which it has is renewed five times or more, the terminal 20 decides to perform the two-dimensional positioning by using the altitude information 158 which it has, at the next positioning (step ST5). The step ST5 is an example of a step of deciding a positioning method. Specifically, the terminal 20 generates next time positioning method information 180 (refer to FIG. 3) indicating the two-dimensional positioning.

Subsequently, the terminal 20 judges whether or not the speed is 60 km/h or more (step ST6).

In the step ST6, when the terminal 20 judges that the speed is 60 km/h or more, this weakens the gain α of the filtering (step ST7). However, if the gain α is weakened too much, an effect in a case in which the new altitude is significantly incorrect is too large, so that the gain will not be lower than the minimum gain α.

On the other hand, in the step ST6, when the terminal 20 judges that the speed is not 60 km/h or more, this strengthens the gain α of the filtering (step ST7A). However, if the gain α is strengthened too much, components of the new altitude may not be introduced, so that the gain will not be higher than the maximum gain α.

Next, the terminal 20 renews the altitude information 158 which it has based on the three-dimensional altitude information 164 by using the gain α set in the step ST7 or ST7A (step ST8).

The above-described steps ST7, ST7A and ST8 are, as a whole, an example of a step of renewing an altitude information.

The terminal 20 performs the two-dimensional positioning by using the altitude information 158 which it has at the next positioning.

In the above-described step ST4, when the terminal 20 judges that the altitude information 158 which it has is not renewed five times or more, the terminal 20 decides to perform the three-dimensional positioning at the next positioning (step ST51). The step ST51 also is an example of a step of deciding a positioning method. Specifically, the terminal 20 generates the next time positioning method information 180 (refer to FIG. 3), indicating the three-dimensional positioning. When the altitude information 158 which it has is not renewed five times or more, the altitude H1 indicated in the altitude information 158 is far from the real altitude and does not stabilized in the vicinity of the real altitude, so that the positioning error may increase, if the two-dimensional positioning is performed by using the altitude information 158. Therefore, when the altitude information 158 which is not renewed five times or more, the three-dimensional positioning will be performed at the next positioning.

Next, the terminal 20 strengthens the gain of the filtering (step S52).

Subsequently, the terminal 20 renews the altitude information 158 based on the three-dimensional altitude information 164 (step ST53). The steps ST52 and ST53 are also, as a whole, an example of a step of renewing altitude information.

And the terminal 20 performs the three-dimensional positioning by receiving the signal S1 and the like at the next positioning.

In the above-described step ST3, when the terminal 20 judges that the reliability of the three-dimensional altitude information 164 is out of the reliability allowable range, this judges whether or not the altitude information 158 which it has is renewed five times or more (step ST61 in FIG. 7). The step ST61 also is an example of a step of evaluating the renewal times.

In the step ST61, when the terminal 20 judges that this renews the altitude information 158 which it has five times or more, the terminal 20 decides to perform the two-dimensional positioning by using the altitude information 158 which it has at the next positioning (step ST62). The step ST62 also is an example of a step of deciding a positioning method.

Subsequently, the terminal 20 sets the gain α of the filtering as maximum (step ST63).

Next, the terminal 20 renews the altitude information 158 which it has based on the three-dimensional altitude information 164 by using the gain α set at the step ST63 (step ST64).

The above-described steps ST63 and ST64 also are, as a whole, an example of a step of renewing the altitude information renewing step.

And the terminal 20 performs the two-dimensional positioning by using the altitude information 158 which it has at the next positioning.

In the above-described step ST61, when the terminal 20 judges that the altitude information 158 which it has is not renewed five times or more, the terminal 20 decides to perform the three-dimensional positioning at the next positioning (step ST62A). The step ST62A also is an example of a step of deciding the positioning method.

And the terminal 20 does not renew the altitude information 158. When the altitude information 158 is not renewed five times or more, there may be a case in which the altitude information 158 loses touch with the real altitude, and the altitude information 158 is not necessarily stabilized in the vicinity of the real altitude. If the altitude information 158 is renewed by using the three-dimensional altitude information 164 out of the reliability allowable range, it is highly possible that the renewed altitude information 158 further loses touch with the real altitude.

And, the terminal 20 performs the three-dimensional positioning at the next positioning.

As described above, according to the terminal 20, the correct altitude information to be used for the two-dimensional positioning can be obtained while reducing the burden on memory to hold the altitude data and the effect of the bad positioning condition at the previous positioning.

Figure 8:
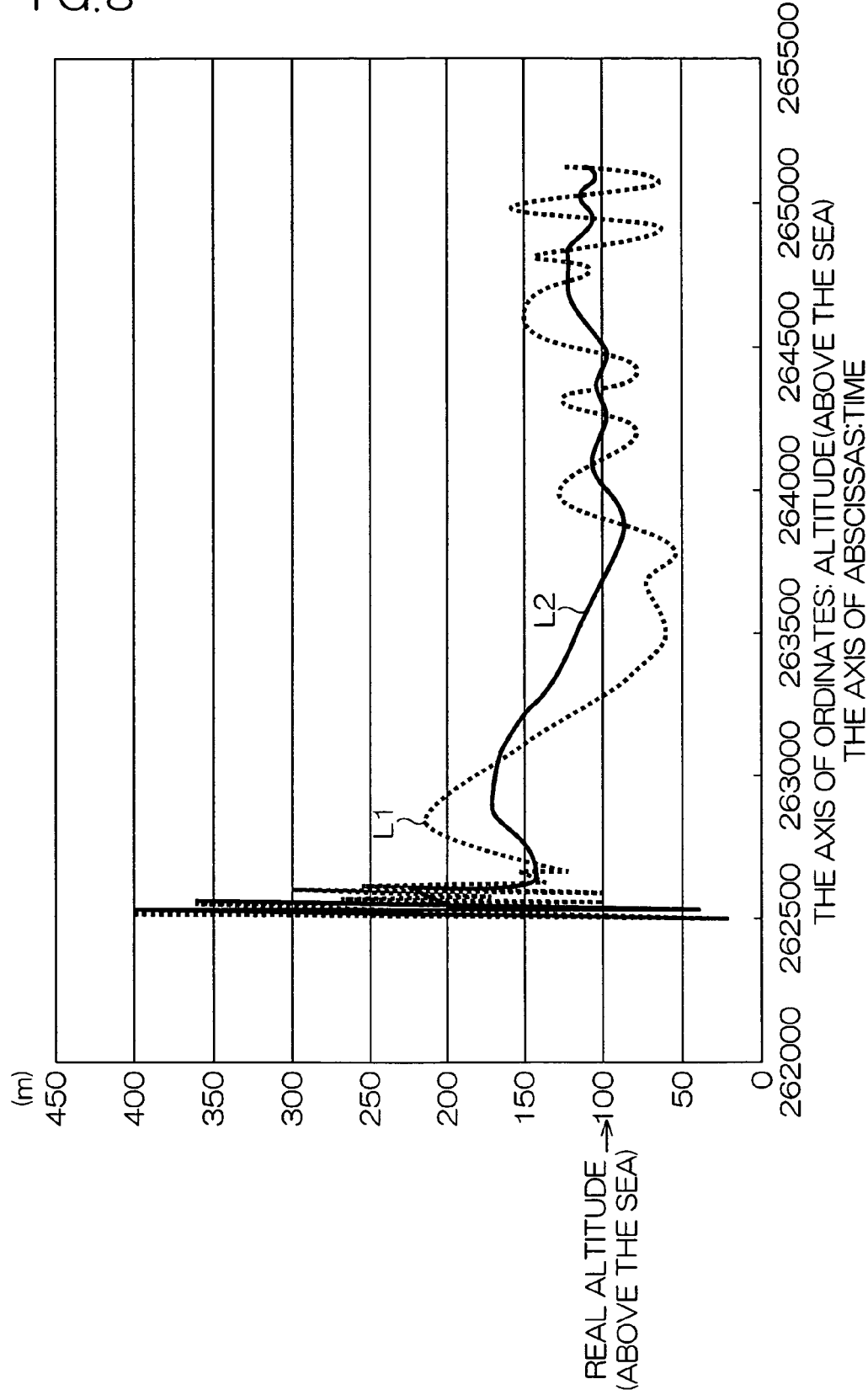
FIG. 8 is a graph showing an example of an actual value of the altitude.

FIG. 8 is a graph showing an example of an actual value of the altitude.

In the graph of FIG. 8, the axis of ordinate and the axis of abscissas represent the altitude and the time, respectively.

Meanwhile, in the graph of FIG. 8, the altitude is redrawn to elevation based on a level surface.

A line L1 represents an actual value of the elevation obtained as the result of the positioning using a combination of the GPS satellites with the minimum VDOP (hereinafter, referred to as a conventional example).

A line L2 represents an actual value of the elevation generated by the terminal 20. The elevation generated by the terminal 20 is obtained by redrawing the altitude H1 of the altitude information 158 based on the level surface.

As shown in FIG. 8, the line L2 approximates the real altitude, which is 100 m, faster than the line L1, and is stabilized in the vicinity of 100 m.

Consequently, the positioning result of the two-dimensional positioning using the elevation (value on the line L2) generated by the terminal 20 becomes highly precise information having a small positioning error as compared to the case using the elevation of the conventional example. Program and Computer Readable Recording Media, etc.

A control program of the positioning device to cause the computer to execute the steps of generating the three-dimensional coordinate information; generating the positioning condition information; judging the altitude information reliability; renewing the altitude information; evaluating renewal times; deciding positioning method and the like of the above-described operating example, can be realized.

And, a computer readable recording medium and the like recording the control program and the like of such positioning device can be realized.

A program storage medium to be used for installing the control program or the like of the terminal device or the like in the computer and making it executable by the computer can be realized, for example, not only by a package media such as a flexible disk such as a floppy (registered trademark) and a CD-ROM (Compact Disc Read Only Memory), a CD-R (Compact Disc-Recordable), a CD-RW (Compact Disc-Rewritable), and a DVD (Digital Versatile Disc) or the like but also by a semiconductor memory, a magnetic disk or a magnetic optical disk for temporally or permanently storing the program therein.

The present invention is not limited to the above-described respective embodiments. Further, the above-described respective embodiments may be combined with each other.

What is claimed is:

1. A switch control method for a positioning method, the switch control method comprising:
    performing three-dimensional positioning that calculates position coordinates on a ground using satellite signals from positioning satellites;
    renewing first altitude information stored in a storage section using first altitude information and second altitude information that is included in the position coordinates calculated by the three-dimensional positioning; and
    switching the positioning method from the three-dimensional positioning method to a two-dimensional positioning method when the number of times that the first altitude information is renewed has reached a predetermined number.

2. The method according to claim 1, the renewing of the first altitude information including renewing the first altitude information by making a weight of the first altitude information heavier as compared with the second altitude information as the number of times that the first altitude information is renewed increases.

3. The method according to claim 1, further comprising:

determining a positioning condition when the three-dimensional positioning method is performed;

judging whether reliability of the second altitude information is within a predetermined allowable range or not based on the positioning condition; and allowing a gain stored in a gain storage section to remain unchanged when the reliability of the second altitude information is not within the allowable range, and increasing the gain when the reliability of the second altitude information is within the allowable range, each time the first altitude information is renewed until the number of times that the first altitude information is renewed reaches the predetermined number, the renewing of the first altitude information including renewing the first altitude information by making a weight of the first altitude information heavier as compared with the second altitude information as the gain increases.

4. The method of claim 3, wherein the renewing of the first altitude information includes calculating a renewal altitude between the first altitude information and the second altitude information using the gain, and renewing the first altitude information with the calculated renewal altitude.

5. A positioning device comprising:

an altitude information storage section that stores first altitude information;

a satellite signal receiving section that receives satellite signals from positioning satellites;

a positioning section that calculates position coordinates;

a three-dimensional positioning control section that causes the positioning section to perform three-dimensional positioning that calculates position coordinates on a ground using the satellite signals;

an altitude information renewing section that renews the first altitude information stored in the altitude information storage section using the first altitude information and second altitude information that is included in the position coordinates calculated by the three-dimensional positioning control section; and a two-dimensional positioning control section that causes the positioning section to perform two-dimensional positioning that calculates position coordinates using the satellite signals and the first altitude information when the number of times that the first altitude information is renewed has reached a predetermined number.

* * * * *